United States Patent
Park

(10) Patent No.: US 9,973,803 B2
(45) Date of Patent: May 15, 2018

(54) VIDEO STREAMING SERVICE SYSTEM AND METHOD FOR AUTOMATIC HOME NETWORK CONNECTION

(71) Applicant: HUMAX CO., LTD., Yongin (KR)

(72) Inventor: Sung Heum Park, Yongin (KR)

(73) Assignee: HUMAX CO., LTD., Yongin (KR)

( * ) Notice: Subject to any disclaimer, the term of this patent is extended or adjusted under 35 U.S.C. 154(b) by 284 days.

(21) Appl. No.: 14/746,632

(22) Filed: Jun. 22, 2015

(65) Prior Publication Data
US 2015/0373390 A1 Dec. 24, 2015

(30) Foreign Application Priority Data

Jun. 24, 2014 (KR) ........................ 10-2014-0077344

(51) Int. Cl.
*H04N 21/418* (2011.01)
*H04N 5/445* (2011.01)
(Continued)

(52) U.S. Cl.
CPC ..... *H04N 21/4182* (2013.01); *H04L 12/2801* (2013.01); *H04L 29/06782* (2013.01); *H04L 29/06802* (2013.01); *H04L 65/4069* (2013.01); *H04N 5/44543* (2013.01); *H04N 7/106* (2013.01); *H04N 21/4181* (2013.01); *H04N 21/4184* (2013.01); *H04N 21/43615* (2013.01); *H04N 21/43632* (2013.01); *H04N 21/43637* (2013.01); *H04N 21/4432* (2013.01); *H04N 21/4622* (2013.01); *H04N 21/4126* (2013.01);
(Continued)

(58) Field of Classification Search
CPC ........... H04N 21/4182; H04N 21/4184; H04N 21/4181; H04N 21/43637; H04N 21/4622; H04N 21/43615; H04N 21/43632; H04N 5/44543; H04N 7/106; H04N 2005/44578; H04L 65/4069; H04L 12/2801; H04L 29/06782; H04L 29/06802
See application file for complete search history.

(56) References Cited

U.S. PATENT DOCUMENTS

| | | | | |
|---|---|---|---|---|
| 8,181,208 B1 * | 5/2012 | Elwardani | ............ | H04N 7/106 725/144 |
| 2002/0021465 A1 * | 2/2002 | Moore, Jr. | ......... | H04L 12/2803 398/72 |

(Continued)

FOREIGN PATENT DOCUMENTS

| | | | | |
|---|---|---|---|---|
| EP | 1589699 A2 * | 10/2005 | ......... | H04L 12/2803 |
| KR | 10-2009-0052895 A | 5/2009 | | |
| WO | WO 2005074227 A2 * | 8/2005 | ............ | G06F 21/32 |

OTHER PUBLICATIONS

Extended European Search Report for European Application No. 15172740.1, dated Aug. 21, 2015.
(Continued)

*Primary Examiner* — Kostas Katsikis

(57) ABSTRACT

A video streaming service system may include a home media sever configured to send wireless network information to a dongle device when the dongle device is connected to the home media server and the dongle device configured to receive the wireless network information from the home media server and maintain the connection with a home network by configuring the received wireless network information.

15 Claims, 5 Drawing Sheets

(51) Int. Cl.
  *H04N 21/436* (2011.01)
  *H04N 21/4363* (2011.01)
  *H04L 12/28* (2006.01)
  *H04N 21/462* (2011.01)
  *H04L 29/06* (2006.01)
  *H04N 7/10* (2006.01)
  *H04N 21/443* (2011.01)
  *H04N 21/41* (2011.01)
  *H04N 21/422* (2011.01)

(52) U.S. Cl.
  CPC . *H04N 21/422* (2013.01); *H04N 2005/44578* (2013.01)

(56) References Cited

U.S. PATENT DOCUMENTS

| | | | | |
|---|---|---|---|---|
| 2004/0068756 | A1* | 4/2004 | Chiu | H04N 21/43615 725/135 |
| 2004/0123097 | A1* | 6/2004 | Ranjan | G11B 20/00086 713/153 |
| 2009/0313675 | A1* | 12/2009 | Howarter | H04N 21/43615 725/119 |
| 2010/0075604 | A1* | 3/2010 | Lydon | G06F 21/31 455/41.3 |
| 2010/0154014 | A1* | 6/2010 | Andersen | H04L 67/1097 725/110 |
| 2011/0202443 | A1* | 8/2011 | Martin | G06Q 30/02 705/34 |
| 2012/0144502 | A1* | 6/2012 | Smith | G06F 21/105 726/30 |
| 2013/0086245 | A1* | 4/2013 | Lu | H04L 12/2807 709/223 |
| 2013/0114653 | A1* | 5/2013 | Schweikhardt | G11B 27/10 375/219 |
| 2013/0258900 | A1* | 10/2013 | Kokkinen | H04W 24/00 370/254 |
| 2014/0039697 | A1* | 2/2014 | Weiler | A01G 25/16 700/284 |
| 2014/0040623 | A1* | 2/2014 | Conus | H04N 21/222 713/176 |
| 2014/0101728 | A1* | 4/2014 | Defrance | H04L 12/2836 726/4 |
| 2014/0273963 | A1* | 9/2014 | Su | H04W 12/06 455/411 |
| 2015/0282216 | A1* | 10/2015 | Reshef | H04W 8/005 455/39 |
| 2015/0304589 | A1* | 10/2015 | Candelore | H04B 5/0031 348/563 |
| 2015/0312623 | A1* | 10/2015 | Li | H04N 21/472 725/32 |
| 2015/0356279 | A1* | 12/2015 | Montana | G06F 21/105 726/28 |
| 2016/0188279 | A1* | 6/2016 | Rajamani | G06F 3/1454 345/2.3 |
| 2017/0272938 | A1* | 9/2017 | Bradish | H04W 8/26 |

OTHER PUBLICATIONS

Michael A. Prospero, "How to Set Up Google Chromecast", Tom's Guide, Jul. 30, 2013, pp. 1-6, http://www.tomsguide.com/us/chromecast-how-to.review-1811.html.

Donald Bell, "How to set up a Chromecast", CNET, Jul. 26, 2013, pp. 1-7, http://www.cnet.com/how-to/how-to-set-up-a-chromecast/.

Janko Roettgers, "Chromecast's secret weapon to take over your TV: HDMI-CEC", Gigaom, Jul. 24, 2013, pp. 1-16, https://gigaom.com/2013/07/24/chromecast-hdmi-cec/.

Alexander Stein, "Chromecast: Lokale Dateien mit Plex abspielen", CHIP, Mar. 25, 2014, pp. 1-4, http://praxistipps.chip.de/chromecast-lokale-dateien-mit-plex-abspielen_28989.

European Office Action for European Application No. 15 172 740.1 dated Aug. 24, 2016.

Samsung, "E-MANUEL", XP055296157, May 8, 2013, pp. 1-208, http://downloadcenter.samsung.com/content/UM/201305/20130508164009296/[ENG]FP9DVBADF-0502.pdf.

* cited by examiner

VIDEO STREAMING SERVICE SYSTEM AND METHOD FOR AUTOMATIC HOME NETWORK CONNECTION

BACKGROUND OF THE INVENTION

Field of the Invention

Exemplary embodiments of the present invention relate to a video streaming service system and method for automatic home network connection, and more particularly, to a video streaming service system and method for automatic home network connection, wherein when a High Density Multimedia Interface (HDMI) dongle type Over The Top (OTT) device is plugged in a Home Media Server (HMS), the HMS sends wireless network information to the OTT device without a user's complicated configuration process so that the OTT device is automatically connected to a home network based on the wireless network information.

Description of the Related Art

OTT service means video pay streaming service using an Internet TV method in which third party operators, together with existing communication and broadcasting operators, provide a variety of types of media content, such as dramas or movies, through the Internet.

Recently, HDMI dongle type OTT devices, such as Google Chromecast, are being placed on the market. Such a device connects with an "HDMI in port" at the back of a TV screen and functions as an OTT player. In the case of an existing remote controller using an Infrared (IR) method, however, the OTT device cannot be controlled because the OTT device is covered by the TV screen and thus an IR signal is unable to be received.

In order to solve such a problem, a remote controller which supports Bluetooth or Wi-Fi communication may be provided. In the case of an OTT device, however, a remote controller that requires high cost is not commonly provided because a unit cost of the OTT device is low.

Common manufacturers provide remote Apps for mobile devices (e.g., mobile phones or tablets) in order to control the OTT device. Users install corresponding remote Apps on their mobile device and use the OTT devices.

In order for the remote App to operate, however, first, the mobile device of a user and the OTT device must be connected over the same home network. The dongle type OTT device needs to be connected to a home network, such as Wi-Fi, in terms of hardware (HW). In the first state in which a controller is not present, a task for selecting the SSID of a wireless sharer (AP) and inputting a password may not be performed.

In order to solve such a problem, most of manufacturers adopt a method of making an dongle type OTT device in a soft AP state in the first installation stage, directly connecting a user's PC or mobile device to the dongle type OTT device, performing operations for wireless connection, and inputting a password.

However, such a configuration method is problematic in that it is very difficult for common users and a complicated process, such as that described above, must be performed again if the configuration of a wireless home network is changed.

SUMMARY OF THE INVENTION

An object of the present invention is to provide a video streaming service system and method for automatic home network connection, wherein when an HDMI dongle type OTT device is plugged in an HMS, the HMS sends wireless network information to the OTT device without a user's complicated configuration process so that the OTT device is automatically connected to a home network based on the wireless network information.

In accordance with an aspect of the present invention for achieving the object of the present invention, there may be provided a video streaming service system for automatic home network connection, including a home media sever configured to send wireless network information to a dongle device when the dongle device is connected to the home media server and the dongle device configured to receive the wireless network information from the home media server and maintain the connection with a home network by configuring the received wireless network information.

Furthermore, the dongle device may be connected to the home media server through an HMDI using plug-in connections or may be connected to the home media server through a USB connection terminal used for power supply.

Furthermore, the wireless network information may include the SSID and password of the AP of the home network.

Furthermore, the home media server may be further configured to include a function for determining whether the connected dongle device is a product capable of receiving the wireless network information in accordance with a predetermined method when the dongle device is connected to the home media server.

Furthermore, the home media server may be further configured to recognize the dongle device to be a USB storage device if the dongle device is connected to the home media server through a USB connection terminal and to send information about the SSID and password of the AP of the home network to the dongle device so that the SSID and password are recorded in a predetermined specific flash region of the dongle device.

Furthermore, the home media server may be further configured to operate according to a specific custom file of HDMI CEC if the dongle device is connected to the home media server through an HMDI using plug-in connections and to send information about the SSID and password of the AP of the home network to the dongle device.

Furthermore, the dongle device may be further configured to store network "ON" information in the predetermined specific flash region when the connection with the wired or wireless sharer of the home network is completed based on the SSID and password recorded in the predetermined specific flash region.

Furthermore, the home media server may be further configured to notify a user that the connection of the dongle device with the wired or wireless sharer has been completed through a GUI on a TV screen, the flickering of an LED at the front, or a Vacuum Flourescent Display (VFD).

In accordance with another aspect of the present invention for achieving the object of the present invention, there may be provided a dongle device configured to include a predetermined specific flash region, receive information about a wireless network from a home media sever when the dongle devices is connected to the home media server through a USB connection terminal or to the home media server through an HMDI using plug-in connections, record the information about the wireless network in the predetermined specific flash region, and maintain the connection with a home network by configuring the wireless network information.

In accordance with yet another aspect of the present invention for achieving the object of the present invention, there may be provided a home media sever configured to have a dongle device connected to the home media server through a USB connection terminal or to the home media server through an HMDI using plug-in connections and to send wireless network information to the dongle device so that the wireless network information is recorded in a predetermined specific flash region of the dongle device if the connected dongle device is determined to be a product capable of receiving the wireless network information in accordance with a predetermined method.

In accordance with still yet another aspect of the present invention for achieving the object of the present invention, there may be provided a video streaming service method for automatic home network connection, including connecting, by a dongle device, with a home media server, sending, by the home media server, wireless network information to the dongle device, and maintaining, by the dongle device, the connection with a home network by configuring the wireless network information.

Furthermore, connecting, by a dongle device, with a home media server may include connecting, by the dongle device, with the home media server through an HMDI using plug-in connections or with the home media server through a USB connection terminal used for power supply.

Furthermore, the wireless network information may include the SSID and password of the AP of a home network.

Furthermore, connecting, by a dongle device, with a home media server may include recognizing, by the home media server, the dongle device to be a USB storage device if the dongle device is connected to the home media server through a USB connection terminal and send information about the SSID and password of the AP of the home network to the dongle device so that the SSID and password are recorded in a predetermined specific flash region of the dongle device.

Furthermore, sending, by the home media server, wireless network information to the dongle device may include sending, by the home media server, the wireless network information to the dongle device if the connected dongle device is determined to be a product capable of receiving the wireless network information in accordance with a predetermined method.

Furthermore, connecting, by a dongle device, with a home media server may include storing, by the dongle device, network "ON" information in a predetermined specific flash region when the connection with the wired or wireless sharer of the home network is completed based on the SSID and password recorded in the predetermined specific flash region.

Furthermore, connecting, by a dongle device, with a home media server may include notifying, by the home media server, a user that the connection of the dongle device with the home network has been completed through a GUI on a TV screen, the flickering of an LED at the front, or a VFD.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Figure 1:
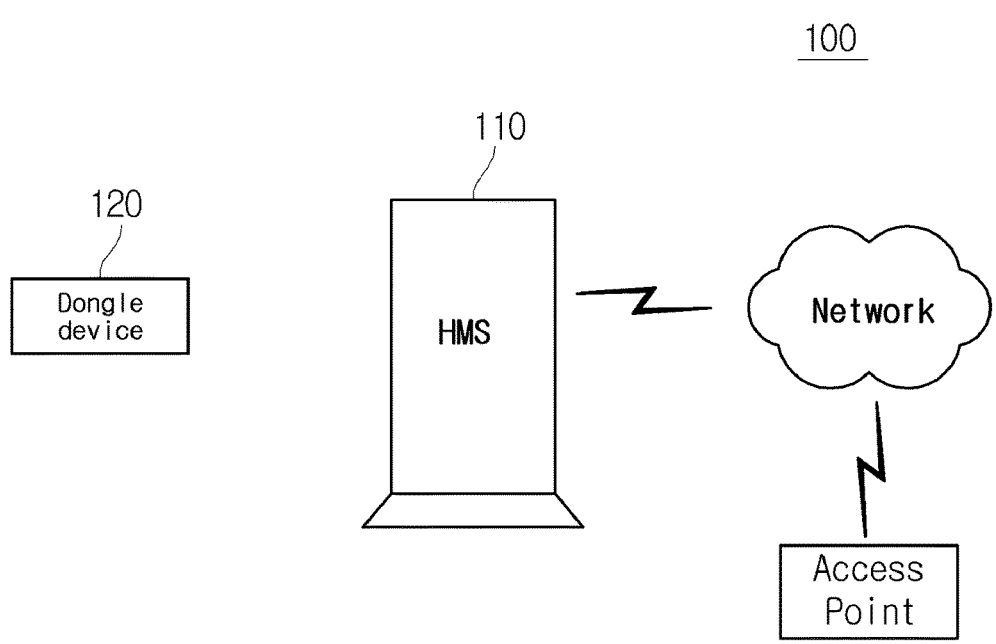
FIG. 1 is a diagram schematically illustrating the overall configuration of a video streaming service system for automatic home network connection in accordance with an embodiment of the present invention.

The present invention may be modified in various ways and may have multiple embodiments, and thus specific embodiments will be illustrated in the drawings and described in detail. It is however to be understood that the specific embodiments are not intended to limit the present invention and the embodiments may include all changes, equivalents, and substitutions that are included in the spirit and technical scope of the present invention.

A video streaming service system and method for automatic home network connection in accordance with some embodiments of the present invention are described in detail with reference to the accompanying drawings. In describing the embodiments of the present invention with reference to the accompanying drawings, the same reference numbers will be used throughout the drawings to refer to the same or like parts, and redundant descriptions thereof are omitted.

FIG. 1 is a diagram schematically illustrating the overall configuration of a video streaming service system for automatic home network connection in accordance with an embodiment of the present invention.

Referring to FIG. 1, the video streaming service system 100 for automatic home network connection in accordance with an embodiment of the present invention includes a Home Media Server (HMS) 110 and a dongle device 120.

When the dongle device 120 is connected to the HMS 110, the HMS 110 sends wireless network information to the dongle device 120. The wireless network information includes the SSID and password of a home network Access Point (AP).

The HMS 110 has a function of determining whether or not the dongle device 120 is a product capable of receiving wireless network information in accordance with a predetermined method when the dongle device 120 is connected to the HMS 110.

More specifically, the dongle device 120 is connected to the HMS 110. If the connected dongle device 120 is recognized as being an eco-system device in accordance with a predetermined method, the HMS 110 sends wireless network information, including the SSID and password of the AP of a home network, to the dongle device 120.

In this case, in accordance with the predetermined method, whether or not a file including information indicative of a dongle device of a specific company is stored in a specific flash region, that is, a flash storage root folder (it may not be a root folder), of the dongle device 120 is checked. When a specific USB storage device or the dongle device 120 is connected to the HMS 110, the HMS 110 first searches files included in the flash storage root folder in order to determine whether or not the connected dongle device 120 is a product of the specific company, opens a corresponding file, reads corresponding information, and recognizes the dongle device 120 to be the dongle device of the specific company.

The dongle device 120 receives the wireless network information from the HMS 110 and configures the received wireless network information in order to maintain the connection with the home network.

The dongle device 120 may be connected to the HMS 110 through an HMDI using plug-in connections or may be connected to the HMS 110 through a USB connection terminal used for the supply of power.

If the dongle device 120 is connected to the HMS 110 through the HMDI using plug-in connections, the HMS 110 operates according to a specific custom file of HDMI Consumer Electronics Control (CEC) and sends information about the SSID and password (PW) of the AP of the home network to the dongle device 120.

If the dongle device 120 is connected to the HMS 110 through the USB connection terminal, the HMS 110 may recognize the dongle device 120 to be a USB storage device and may send information about the SSID and password of the AP of the home network to the dongle device 120 so that the SSID and the password are recorded in a predetermined specific flash region of the dongle device 120.

If the dongle device 120 is connected to the HMS 110 through the USB connection terminal, the HMS 110 sends only audio and videos through the HMDI and supplies power through USB connection.

The HMS 110 notifies a user that the dongle device 120 has been connected to the home network through a Graphic User Interface (GUI) on a TV screen, through the flickering of an LED at the front, or through a Vacuum Flourescent Display (VFD).

After obtaining information about a wireless network, that is, the information about the SSID and password of the AP of the home network from the HMS 110, the dongle device 120 maintains connection to the home network using the same method as a common method of accessing a network based on AP information.

When the connection with the wired/wireless sharer of the home network is completed based on the SSID and password recorded in the predetermined specific flash region, the dongle device 120 stores network "ON" information in the predetermined specific flash region.

Figure 2:
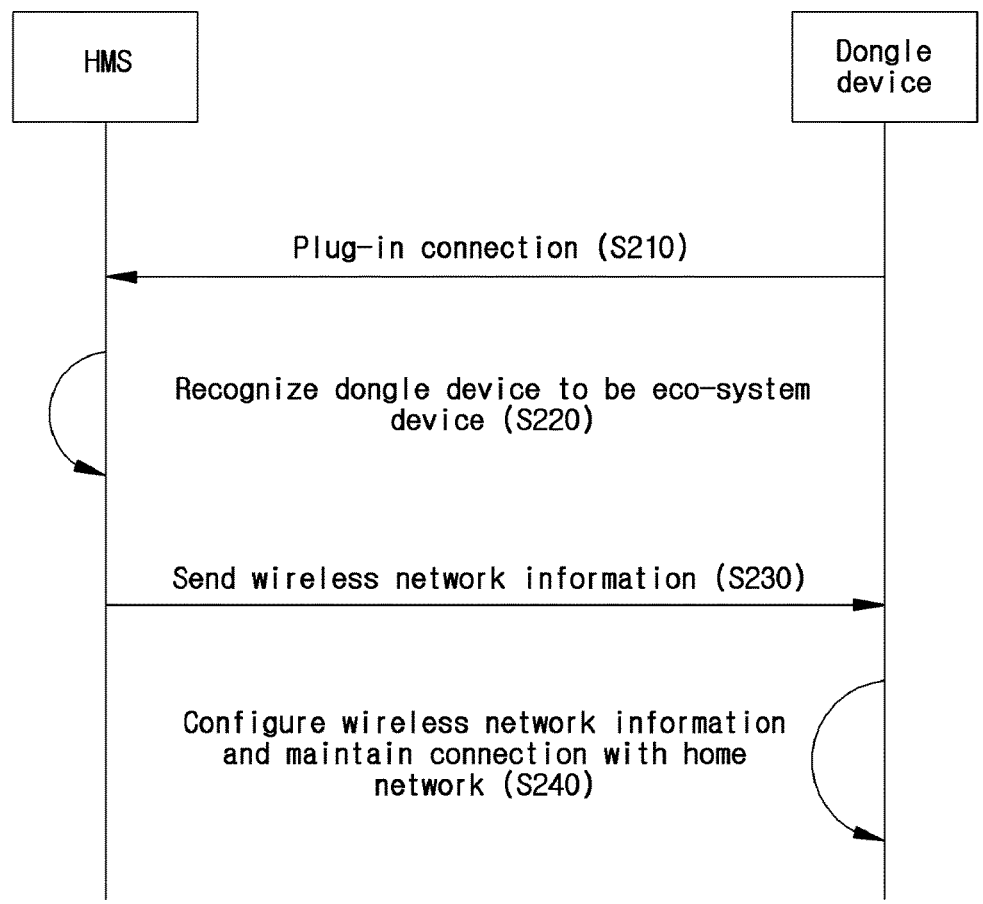
FIG. 2 is a flowchart illustrating a video streaming service method for automatic home network connection in accordance with an embodiment of the present invention.

FIG. 2 is a flowchart illustrating a video streaming service method for automatic home network connection in accordance with an embodiment of the present invention.

Referring to FIG. 2, first, the dongle device 120 of the video streaming service system 100 for automatic home network connection in accordance with an embodiment of the present invention is connected to the HMS 110 through plug-in connections at step S210.

Figure 3:
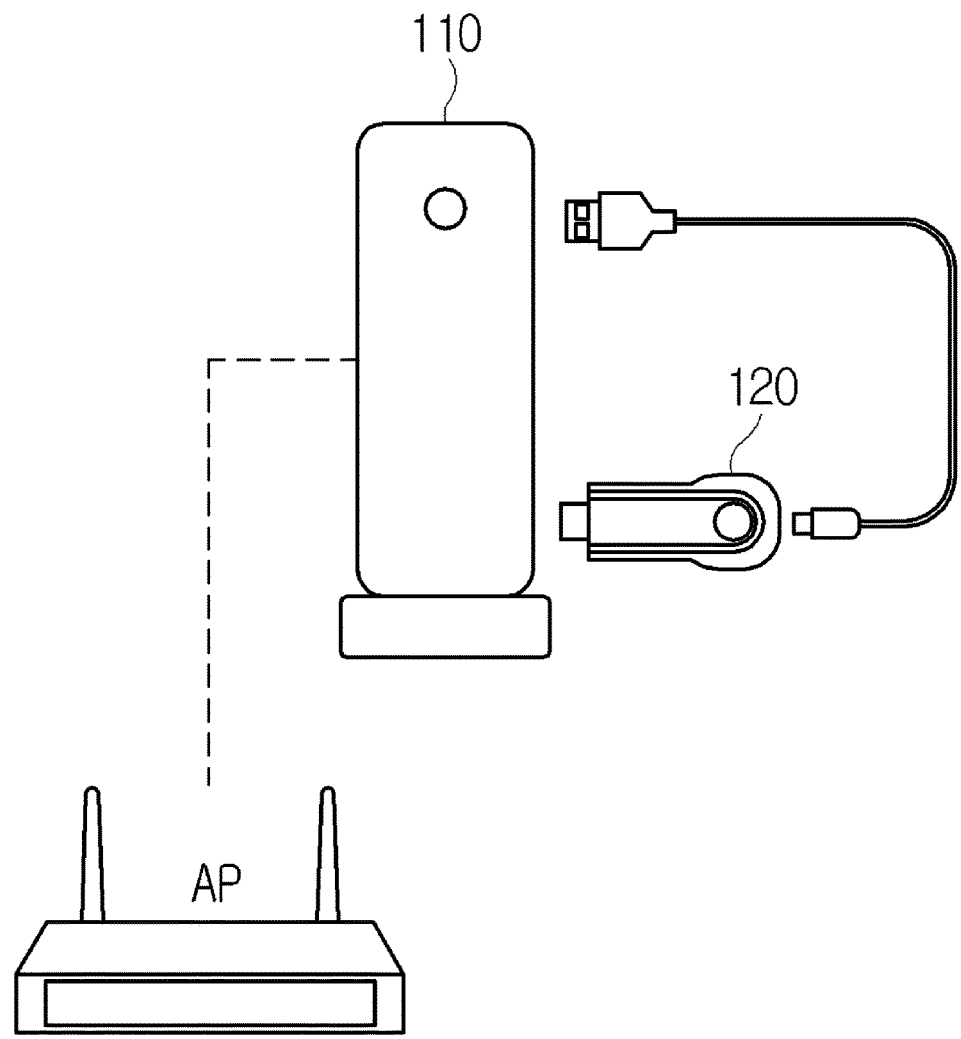
FIG. 3 is a diagram illustrating an example in which a dongle device is connected to an HMS through an HDMI or a USB in accordance with an embodiment of the present invention.

As illustrated in FIG. 3, the dongle device 120 may be connected to the HMS 110 through the HMDI using plug-in connections or may be connected to the HMS 110 through the USB connection terminal used for the supply of power. FIG. 3 is a diagram illustrating an example in which the dongle device 120 is connected to the HMS 110 through the HDMI or the USB connection terminal in accordance with an embodiment of the present invention. In this case, when the dongle device 120 is connected to the HMS 110 through the USB connection terminal or through the HMDI using plug-in connections, the HMS 110 has a function of determining whether or not the dongle device 120 is a product (e.g., an eco-system device) capable of receiving wireless network information in accordance with a predetermined method.

Figure 4:
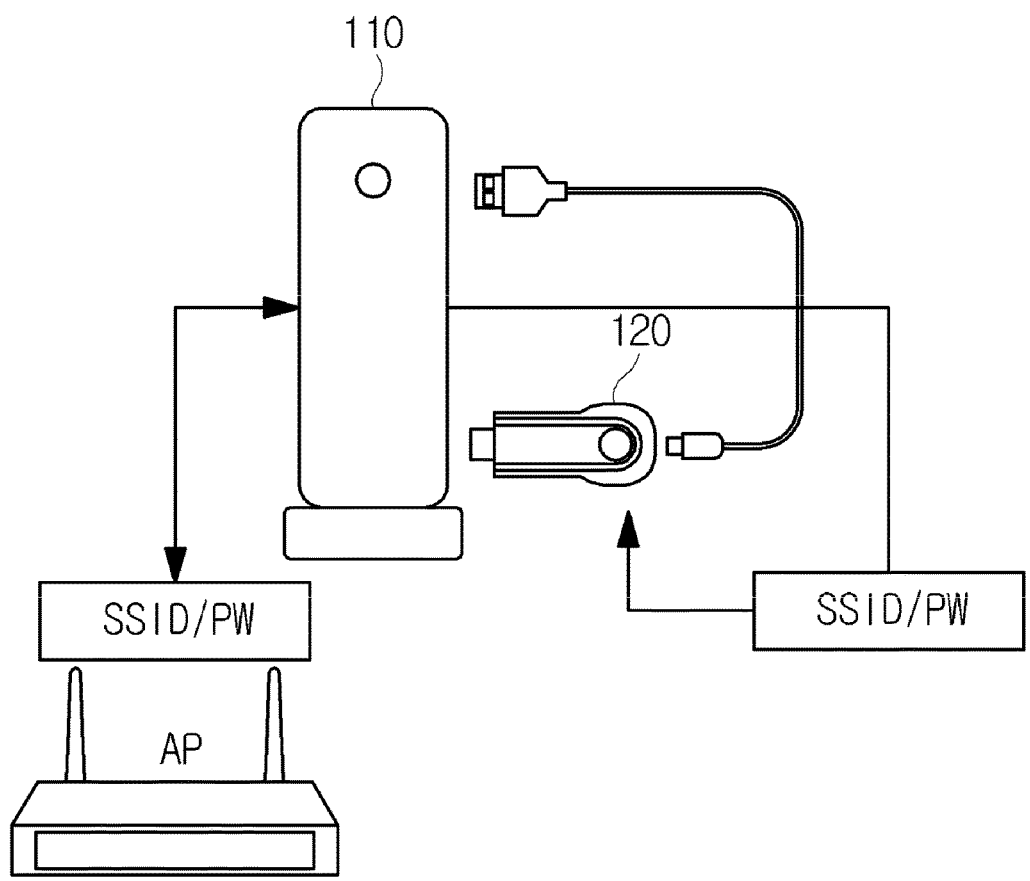
FIG. 4 is a diagram illustrating an example in which wireless network information about a the AP of a home network is transmitted to a dongle device in accordance with an embodiment of the present invention.

If the dongle device 120 connected through plug-in connections is recognized as being an eco-system device at step S220, the HMS 110 sends wireless network information to the dongle device 120 at step S230, as illustrated in FIG. 4. FIG. 4 is a diagram illustrating an example in which wireless network information about the AP of a home network is transmitted to the dongle device 120 in accordance with an embodiment of the present invention.

In this case, the wireless network information includes the SSID and password of the AP of the home network.

If the dongle device 120 is connected to the HMS 110 through the USB connection terminal, the HMS 110 may recognize the dongle device 120 to be a USB storage device and may send information about the SSID and password of the AP of the home network to the dongle device 120 so that the SSID and the password are recorded in a predetermined specific flash region of the dongle device 120.

If the dongle device 120 is connected to the HMS 110 through the HMDI using plug-in connections, the HMS 110 may operate according to a specific custom file of HDMI CEC and may send information about the SSID and password of the AP of the home network to the dongle device 120 so that the SSID and the password are recorded in a predetermined specific flash region of the dongle device 120.

Figure 5:
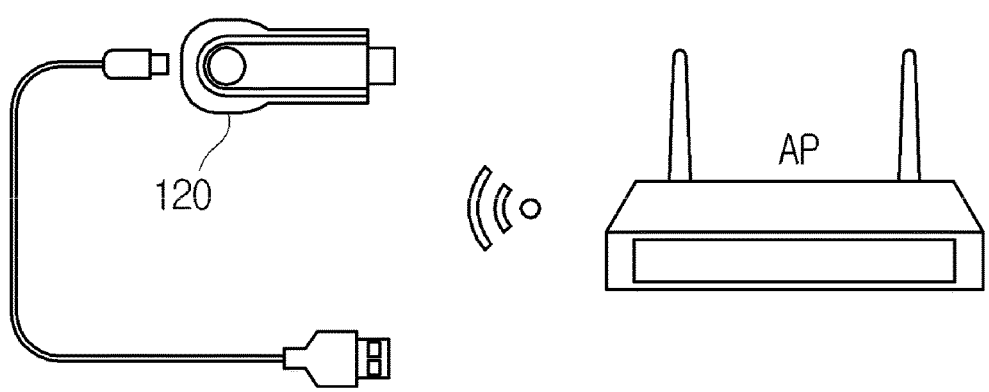
FIG. 5 is a diagram illustrating the state in which a dongle device has been connected to a home network in accordance with an embodiment of the present invention.

Thereafter, the dongle device 120 configures the wireless network information in order to maintain the connection with the home network at step S240, as illustrated in FIG. 5. FIG. 5 is a diagram illustrating the state in which the dongle device 120 has been connected to the home network in accordance with an embodiment of the present invention.

That is, when the connection of the dongle device 120 with the wired/wireless sharer of the home network is completed based on the SSID and password recorded in the predetermined specific flash region, the dongle device 120 stores network "ON" information in the predetermined specific flash region.

More specifically, after obtaining the wireless network information, that is, the information about the SSID and password of the AP of the home network from the HMS 110, the dongle device 120 maintains the connection with the home network through the information about the SSID and password of the AP of the home network using the same method as a common method of accessing a network based on AP information.

In this case, the HMS 110 notifies a user that the dongle device 120 has been connected to the home network through a Graphic User Interface (GUI) on a TV screen, through the flickering of an LED at the front, or through a VFD.

Furthermore, if the dongle device 120 is connected to the HMS 100 through the USB connection terminal, the HMS 110 sends only audio and videos through the HMDI and supplies power through the USB connection terminal.

Accordingly, an HDMI dongle type OTT device can be easily connected to a home network through plug-in connections between eco-systems without a user's complicated process of configuring a wireless network.

If HDMI CEC is used, one of the following menus may be selected and used depending on definition.

That is, one of menus, such as One Touch Play, System Standby, Preset Transfer, One Touch Record, Timer Programming, System Information, Deck Control Tuner Control, OSD Display, Device Menu Control, Routing Control, Remote Control Pass Through, Device OSD Name Transfer, and System Audio Control menu provided by the HMS 110, may be selected and used.

For example, if the menu "Preset Transfer" is selected, a method of customizing a field in which configuration values are transferred and transferring an SSID/PW may be used.

As described above, the present invention can achieve the video streaming service system and method for automatic home network connection in which when the HDMI dongle type OTT device is connected to the HMS through plug-in connections, the HMS sends wireless network information to the OTT device without a user's complicated configuration process and the OTT device is automatically connected to a home network based on the wireless network information.

Those skilled in the art to which the present invention pertains will understand that the present invention may be implemented in various detailed forms without changing the technical spirit or indispensable characteristics of the present invention. It will be understood that the aforementioned embodiments are illustrative and not limitative from all aspects. The scope of the present invention is defined by the appended claims rather than the detailed description, and the present invention should be construed as covering all modifications or variations derived from the meaning and scope of the appended claims and their equivalent.

What is claimed is:

1. A video streaming service system for automatic home network connection, comprising:
    a home media server configured to send wireless network information to a dongle device when the dongle device is connected to the home media server; and
    the dongle device configured to receive the wireless network information from the home media server and maintain the connection with a home network by configuring the received wireless network information,
    wherein the home media server comprises at least one of a connection terminal and a media interface,
    wherein the dongle device is connected to the home media server through the at least one of the connection terminal and the media interface,
    wherein the home media server determines whether the dongle device is a product capable of receiving wireless network information based on an identification information acquired from the dongle device by searching for a file stored on the dongle device that contains the identification information, opening the file stored on the dongle device, and reading the identification information, wherein the file containing the identification information is stored in a flash storage root folder of the dongle device, and
    wherein the home media server sends the wireless network information to the dongle device when the dongle device is determined to be capable of receiving the wireless network information.

2. The video streaming service system according to claim 1, wherein the connection terminal includes a Universal Serial Bus (USB) connection terminal and the media interface includes a High Density Multimedia Interface (HDMI) using plug-in connection.

3. The video streaming service system according to claim 1, wherein the wireless network information comprises an SSID and password of an Access Point (AP) of the home network.

4. The video streaming service system according to claim 1, wherein the home media server is further configured to operate according to a specific custom file of High Density Multimedia Interface (HDMI) Consumer Electronics Control (CEC) if the dongle device is connected to the home media server through an High Density Multimedia Interface (HMDI) using plug-in connections and to send information about an SSID and password of an Access Point (AP) of the home network to the dongle device.

5. The video streaming service system according to claim 4, wherein the dongle device is further configured to store network "ON" information in the predetermined specific flash region when the connection with the AP of the home network is completed based on the SSID and password recorded in the predetermined specific flash region.

6. The video streaming service system according to claim 1, wherein the home media server is further configured to:
    recognize the dongle device to be a Universal Serial Bus (USB) storage device if the dongle device is connected to the home media server through a Universal Serial Bus (USB) connection terminal, and
    send information about an SSID and password of an Access Point (AP) of the home network to the dongle device so that the SSID and password are recorded in a predetermined specific flash region of the dongle device.

7. The video streaming service system according to claim 6, wherein the dongle device is further configured to store network "ON" information in the predetermined specific flash region when the connection with the AP of the home network is completed based on the SSID and password recorded in the predetermined specific flash region.

8. The video streaming service system according to claim 7, wherein the home media server is further configured to notify a user that the connection of the dongle device with the AP of the home network has been completed through a Graphic User Interface (GUI) on a TV screen, flickering of an LED at a front, or a Vacuum Fluorescent Display (VFD).

9. An operating method of a home media server configured to have a dongle device connected to the home media server through a Universal Serial Bus (USB) connection terminal or to the home media server through a High Density Multimedia Interface (HMDI) using plug-in connections, the method comprising:
    determining whether the connected dongle device is a product capable of receiving a wireless network information based on an identification information acquired from the connected dongle device by searching, by the home media server, for a file stored in a flash storage root folder of the dongle device that contains the identification information, opening the file stored in the flash storage root folder of the dongle device, and reading the identification information, and
    sending the wireless network information to the dongle device so that the wireless network information is recorded in a predetermined specific flash region of the dongle device if the connected dongle device is determined to be a product capable of receiving the wireless network information in accordance with a predetermined method.

10. A video streaming service method for automatic home network connection, comprising:
    connecting, by a dongle device, with a home media server;
    searching, by the home media server, for a file stored on the dongle device that contains an identification information, opening the file stored on the dongle device, and reading the identification information, wherein the file containing the identification information is stored in a flash storage root folder of the dongle device,
    sending, by the home media server, wireless network information to the dongle device; and maintaining, by the dongle device, the connection with a home network by configuring the wireless network information, wherein the home media server comprises at least one of a connection terminal and a media interface, wherein the dongle device is connected to the home media server through the at least one of the connection terminal and the media interface, and wherein the home media server determines whether the dongle device is a product capable of receiving wireless network information based on the identification information acquired from the dongle device.

11. The video streaming service method according to claim 10, wherein the wireless network information comprises an SSID and password of an Access Point (AP) of a home network.

12. The video streaming service method according to claim 10, wherein the connection terminal includes a Universal Serial Bus (USB) connection terminal and the media interface includes a High Density Multimedia Interface (HDMI) using plug-in connection.

13. The video streaming service method according to claim 12, wherein connecting, by a dongle device, with a home media server comprises:

recognizing, by the home media server, the dongle device to be a USB storage device if the dongle device is connected to the home media server through a USB connection terminal, and send information about an SSID and password of an AP of the home network to the dongle device so that the SSID and password are recorded in a predetermined specific flash region of the dongle device.

14. The video streaming service method according to claim 13, wherein connecting, by a dongle device, with a home media server comprises storing, by the dongle device, network "ON" information in a predetermined specific flash region when the connection with the AP of the home network is completed based on an SSID and password recorded in the predetermined specific flash region.

15. The video streaming service method according to claim 14, wherein connecting, by a dongle device, with a home media server comprises notifying, by the home media server, a user that the connection of the dongle device with the home network has been completed through a Graphic User Interface (GUI) on a TV screen, flickering of an LED at a front, or a Vacuum Fluorescent Display (VFD).

* * * * *